US012210641B2

(12) United States Patent
Pandey et al.

(10) Patent No.: US 12,210,641 B2
(45) Date of Patent: Jan. 28, 2025

(54) SNAPSHOT EXPORT FROM SOFTWARE AS A SERVICE PLATFORMS

(71) Applicant: Rubrik, Inc., Palo Alto, CA (US)

(72) Inventors: Prateek Pandey, Bangalore (IN); Mahesh Kumar Chelimilla, Nandyal (IN); David Terei, Austin, TX (US)

(73) Assignee: Rubrik, Inc., Palo Alto, CA (US)

(*) Notice: Subject to any disclaimer, the term of this patent is extended or adjusted under 35 U.S.C. 154(b) by 379 days.

(21) Appl. No.: 17/864,115

(22) Filed: Jul. 13, 2022

(65) Prior Publication Data
US 2024/0020402 A1 Jan. 18, 2024

(51) Int. Cl.
G06F 21/62 (2013.01)
G06F 11/14 (2006.01)
G06F 21/60 (2013.01)

(52) U.S. Cl.
CPC ...... G06F 21/6218 (2013.01); G06F 11/1446 (2013.01); G06F 21/602 (2013.01)

(58) Field of Classification Search
CPC . G06F 21/602; G06F 21/6218; G06F 11/1446
See application file for complete search history.

(56) References Cited

U.S. PATENT DOCUMENTS

| | | | | |
|---|---|---|---|---|
| 2010/0030990 A1* | 2/2010 | Asai | ...... | G07F 7/1008 711/115 |
| 2014/0304505 A1* | 10/2014 | Dawson | ...... | G06F 21/6227 713/165 |
| 2016/0306796 A1* | 10/2016 | Devasthali | ...... | G06F 16/214 |
| 2023/0315503 A1* | 10/2023 | Lu | ...... | G06F 16/256 718/1 |
| 2024/0168853 A1* | 5/2024 | Kumar | ...... | G06F 11/1451 |

* cited by examiner

Primary Examiner — Chau Le
(74) Attorney, Agent, or Firm — Holland & Hart LLP

(57) ABSTRACT

A data management system (DMS) may facilitate snapshot exports between a snapshot storage account and a computing system. The DMS may receive, from the computing system, a request to download data associated with one or more snapshots stored in the snapshot storage account in a first cloud environment. The DMS may generate an export job for execution by one or more computing resources within the first cloud environment based on the request. The export job may be operable to decrypt the data and write the decrypted data to an export storage account in a second cloud environment. The DMS may generate an encrypted download link that is operable to download the decrypted data from the export storage account. The DMS may transmit the encrypted download link to the computing system associated with the request to download the data.

20 Claims, 10 Drawing Sheets

SNAPSHOT EXPORT FROM SOFTWARE AS A SERVICE PLATFORMS

FIELD OF TECHNOLOGY

The present disclosure relates generally to database systems and data processing, and more specifically to snapshot export from software as a service (SaaS) platforms.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
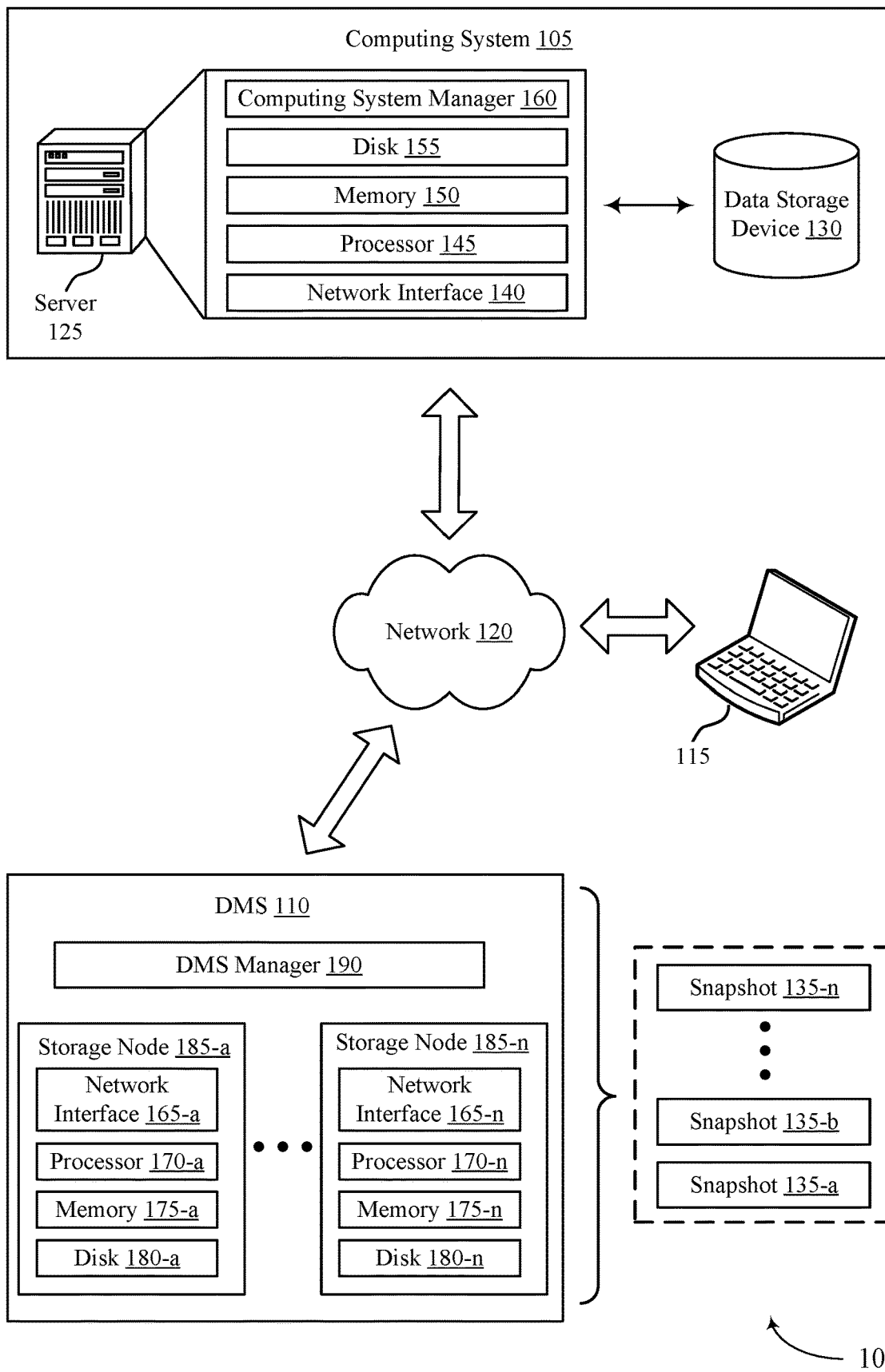
FIG. 1 illustrates an example of a computing environment that supports snapshot export from software as a service (SaaS) platforms in accordance with aspects of the present disclosure.

A data management system (DMS) may obtain snapshots of a customer's enterprise data. The data may be maintained and operated upon by the customer in an operating cloud environment. The DMS may execute within a different cloud environment, which may be referred to as a DMS cloud environment. The DMS may obtain snapshots of the customer's data in the operating cloud environment over time and store the snapshots in a snapshot storage cloud environment, which may be different than both the operating cloud environment and the DMS cloud environment. The snapshot storage cloud environment may be configured by or associated with the customer. In some aspects, the DMS may create and manage computing resources within the snapshot storage cloud environment to support handling and storing the snapshots. The snapshots may be stored in an encrypted format in the snapshot storage cloud environment. The snapshots may be accessible by the DMS, but may not be accessible by the customer or other components or entities (e.g., due to one or more firewalls), for enhanced security.

In some cases, a user at the customer may wish to download the data to the user's local device (e.g., desktop computer), which may alternatively be referred to as a local system, based on the snapshots stored in the snapshot storage cloud environment. The user may not be able to directly download such data from the snapshot storage cloud environment for security reasons (e.g., due to the associated encryption and firewalls). In some cases, the DMS may facilitate the download by fetching the data from the snapshot storage cloud environment, decrypting the data, and forwarding the data to the user via one or more servers. However, the DMS may serve multiple customers, such that having such downloads pass through the DMS may decrease throughput and increase latency. For example, a relatively large download by one customer may adversely impact the DMS's performance for other customers.

Techniques, systems, and devices described herein provide for a secure and scalable approach for a user to download data to a local computing system based on the snapshots stored in the customer's snapshot storage cloud environment. To achieve such downloads, the DMS may identify or generate an export storage account for the customer in a separate cloud environment, which may be referred to as an export storage cloud environment herein. The export storage account may be accessible by the user. The DMS may generate computing resources in the snapshot storage cloud environment and initiate an export job to be executed by the computing resources. Executing the export job may include fetching the requested data from the snapshots in the snapshot storage cloud environment and decrypting the data. The export job may be operable to write the decrypted data to the export storage account in the export storage cloud environment.

The DMS may generate a downlink link associated with the exported data in the export storage account. The download link may be encrypted to reduce potential security risks associated with storing decrypted data in the export storage account. For example, when the downlink link is selected by the user, the link may redirect the user to an interface (e.g., a login page) for inputting user credentials. The DMS may verify the credentials input by the user. If verified, the DMS may decrypt the download link, and the user may be directed to the decrypted data in the export storage account. That is, the encrypted download link may not be usable unless entered into the DMS interface for proper verification. The user may thereby download the requested data from the export storage account, which may reduce latency and improve throughput while maintaining network security.

Aspects of the disclosure are initially described in the context of computing environments supporting snapshot export services. Aspects of the disclosure are further illustrated by and described with reference to process flows, apparatus diagrams, system diagrams, and flowcharts that relate to snapshot export from software as a service (SaaS) platforms.

FIG. 1 illustrates an example of a computing environment 100 that supports snapshot export from SaaS platforms in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through SaaS or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below. In some aspects, the snapshots may be stored in a snapshot storage account within a snapshot cloud environment that may be different than a DMS cloud environment in which the DMS 110 operates and different than an operating cloud environment associated with the computing system 105 (e.g., a cloud environment in which the customer's data is stored). Examples of snapshot storage cloud environments are described in further detail elsewhere herein, including with reference to FIG. 2.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

In some examples, a customer may transmit, to the DMS 110, a request to export data. An export request may be different than a restore request, in some aspects. For example, instead of requesting that a snapshot be restored to the computing system 105 in which the customer's data executes, an export request may request that the data associated with the snapshot be exported to or downloaded to a computing system or a computing device 115 associated with a user of the customer. In some cases, if the snapshots are stored in an encrypted format in a snapshot storage cloud environment (e.g., an Azure storage account, or some other storage account) that is hosted by the DMS platform, by the customer, or both, the customer may be unable to access the snapshots. For example, the snapshot storage cloud environment may be configured with one or more firewalls or security settings such that the DMS 110 may access the snapshot storage account, but other devices or enterprises may not access the snapshot storage account for enhanced security. In such cases, data stored in the snapshot storage account may be downloaded to the customer using the DMS 110 as a proxy such that information associated with the snapshot storage account is not exposed to the customer. However, the DMS 110 may support downloads for multiple customers, and such facilitation of one or more concurrent downloads may increase complexity and latency.

Techniques, systems, and devices described herein provide for archived data stored in a snapshot storage account to be downloaded by a customer without creating a bottleneck at the DMS 110 or a server associated with the DMS 110. A customer may send, via a computing device 115, an export request to download data stored within the snapshot storage account. The DMS 110 may generate, in response to the export request, computing resources in the snapshot storage cloud environment and an export job to be executed by the computing resources. The computing resources may be operable to fetch or retrieve the requested data from the snapshot storage account, decrypt the data, and write the data in an unencrypted format to an export storage account for the customer. The export storage account may be stored within an export storage cloud environment that is different than the DMS cloud environment and the snapshot storage cloud environment. In some aspects, the export storage account may be configured without firewall restrictions, such that the customer may access the export storage account.

The DMS 110 may generate an encrypted download link for accessing the data in the export storage account. If the customer selects the download link, the customer may be redirected to an authorization page where the customer may enter user credentials for a platform associated with the DMS 110. If the user credentials are verified, the customer may be redirected to a file (e.g., a ZIP file) including the requested data in the export storage account. The customer may download the file directly from the export storage account to a local drive of a computing device 115. The described techniques may thereby provide for a customer to download archived data without transferring the data through an operating environment of the customer or through a server associated with the DMS 110, which may reduce latency and improve throughput. Additionally, or alternatively, the export storage account may be created per customer or per geographical region, which may support improved scalability of services by the DMS 110. By utilizing the encrypted download link to verify user credentials before redirecting the customer to the export storage account, the DMS 110 may ensure security of the data stored in the export storage account.

Figure 2:
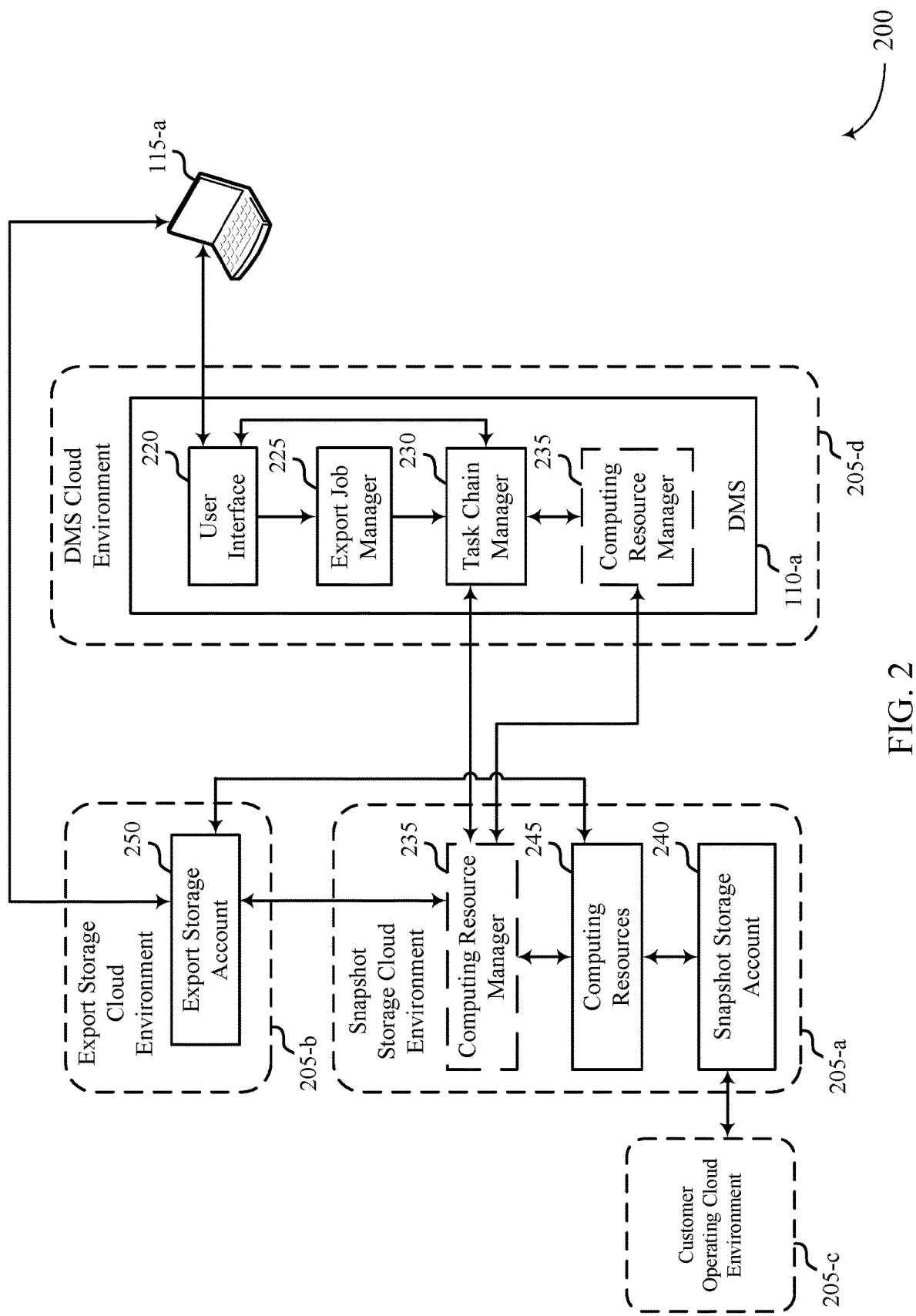
FIG. 2 illustrates an example of a computing environment that supports snapshot export from SaaS platforms in accordance with aspects of the present disclosure.

FIG. 2 illustrates an example of a computing environment 200 that supports snapshot export from SaaS platforms in accordance with aspects of the present disclosure. The computing environment 200 may implement or be implemented by aspects of the computing environment 100 described with reference to FIG. 1. For example, the computing environment 200 includes multiple cloud environments 205, which may represent an example of a computing system 105 as described with reference to FIG. 1. The computing environment 200 also includes a DMS 110-a and a computing device 115-a, which may represent examples of corresponding devices and components as described with reference to FIG. 1. The DMS 110-a may operate in a DMS cloud environment 205-d. The DMS 110-a may interface with computing resources, databases, or both, in one or more other cloud environments 205 to facilitate downloads of data stored in snapshots to the computing device 115-a.

As described with reference to FIG. 1, a customer's enterprise data may be maintained and operated upon by the customer for the customer's operations in an operating cloud environment 205-c. The customer may utilize a DMS 110-a to manage backup and restoration of the customer's data. The DMS 110-a may interface with the operating cloud environment 205-c via one or more networks, as described with reference to FIG. 1. In some aspects, a user of the customer may send one or more requests or instructions to the DMS 110-a using a computing device 115-a. The computing device 115-a may interface with the DMS 110-a via a user interface 220. The customer may request, via the user interface 220, that the DMS 110-a backup the client's data at one or more given times or time intervals. Additionally, or alternatively, the customer may permit the DMS 110-a to automatically obtain backups of the customer's data.

The DMS 110-a may identify or generate a snapshot storage account 240 for the customer in a snapshot storage cloud environment 205-a that is different from the DMS cloud environment 205-d and the operating cloud environment 205-c. The snapshot storage cloud environment 205-a may be referred to as a first cloud environment in some examples described herein. The DMS 110-a may create one or more computing resources in the snapshot storage cloud environment 205-a. The DMS 110-a may utilize the computing resources to obtain snapshots or other backups of the data from the operating cloud environment 205-c and store the snapshots in the snapshot storage account. In some aspects, the snapshots, the data within the snapshots, or both may be stored in an archived and encrypted format in the snapshot storage account 240 for security.

The snapshot storage account 240 in the snapshot storage cloud environment 205-a may be associated with or hosted by the customer, the DMS 110-a, or both. In some aspects, the customer may generate and host the snapshot storage account 240. For example, the customer may configure the snapshot storage cloud environment 205-a and the snapshot storage account 240, and the customer may indicate one or more parameters or settings for the snapshot storage account 240 to the DMS 110-a. The DMS 110-a may utilize the indicated parameters and settings to access the account for snapshot storage. In some other aspects, the DMS 110-a may configure the snapshot storage cloud environment 205-a, the snapshot storage account 240, or both for the customer. For example, the customer may send a request for the DMS 110-a to manage the customer's data, and the DMS 110-a may configure one or more settings for the snapshot storage account 240 based on the customer's request. In some aspects, the snapshot storage account 240 (e.g., an Azure storage account, or some other type of storage account) may be configured with one or more firewalls or security restrictions, such that devices, components, or enterprises other than the DMS 110-a may not access the snapshot storage account 240.

A user of the customer may desire to access data stored in the snapshot storage account 240. The user may send a request, using the computing device 115-a, to the DMS 110-a via the user interface 220. The request may indicate a set of data, one or more files, one or more computing resources, one or more snapshots, or any combination thereof that the customer wishes to download to the computing device 115-a. The data subject to the request may correspond to a first version of a file associated with a first point-in-time that may be earlier than a second version of the file stored in the operating cloud environment 205-c. That is, the user may request to download historical data. The DMS 110-a may receive the request via the user interface 220. In some cases, as described with reference to FIG. 1, the DMS 110-a may act as a proxy between the computing device 115-a and the snapshot storage account 240. For example, the data may be transferred from the snapshot storage account 240, via the DMS 110-a or a server associated with the DMS 110-a, and to the computing device 115-a. In such cases, the DMS 110-a may decrypt the requested data before transferring to the computing device 115-a. However, such on-the-fly decryption and transferal of data may be associated with relatively high processing complexity and increased latency. Additionally, or alternatively, if the DMS 110-a facilitates such downloads for multiple computing systems or customers concurrently or during at least partially overlapping time periods, the downloads may create a bottleneck at the DMS server, which may increase latency and decrease throughput and reliability.

Techniques, systems, and devices described herein provide for relatively efficient, reliable, and scalable downloads from a snapshot storage account 240. To facilitate such downloads, the DMS 110-a may generate one or more computing resources that are operable to transfer requested data to an export storage cloud environment 205-b from which the computing device 115-a may directly download the data. As described herein, a customer may trigger an export job by selecting a recovery option for a given snapshot or set of data via the user interface 220. One or more components within the DMS 110-a may generate an exportjob in response to the request.

The DMS 110-a may generate a set of computing resources 245 within the first cloud environment 205-a (e.g., an exocompute system) to execute the exportjob. For example, the user interface 220 may receive the request from the computing device 115-a and may trigger an export job by forwarding the request to the export job manager 225. The export job manager 225 may generate an export job. Generating the export job may include generating a task chain and sending the task chain to the task chain manager 230. The task chain manager 230 may send, to a computing resource manager 235, a request to create the set of computing resources 245 for executing the export job. The computing resource manager 235 may subsequently generate the set of computing resources 245 in the first cloud environment 205-a. Additionally, or alternatively, the computing resource manager 235 may identify an already generated set of computing resources 245 for execution of the export job. The computing resource manager 235 may represent an example of circuitry or logic within the DMS 110-a, within the snapshot storage cloud environment 205-a, or both.

The DMS 110-a may initiate the export job after the computing resources 245 are generated. In some aspects, the task chain manager 230 may initiate the export job by sending the task chain to the computing resources 245. Additionally, or alternatively, the task chain manager 230 may forward the task chain to the computing resource manager 235, and the computing resource manager 235 may initiate the export job. The task chain for the export job may include one or more phases or tasks. In some aspects, the tasks may include a prepare task, a perform task, and a finish task.

The prepare task may be performed or executed by the DMS 110-a, by the computing resources 245 in the snapshot storage cloud environment 205-a, or both. In some aspects, as part of the prepare task, the computing resource manager 235 may set up or identify an export storage account 250 from which the customer may download data. For example, the computing resource manager 235 may identify one or more user credentials associated with the computing device 115-a from which the request was received, such as an identifier of the computing device 115-a, security credentials of the computing device 115-a, a storage account associated with the computing device 115-a, a geographical location or region of the computing device 115-a, or any combination thereof. The computing resource manager 235 may identify one or more credentials associated with the export storage account 250 based on the user credentials. For example, the computing resource manager 235 may identify an export storage account 250 that is configured to store data associated with computing devices in a certain geographical region that corresponds to a geographical region indicated via the user credentials for the computing device 115-a. The export storage account 250 may be configured within a second cloud environment 205-b that is different than the first cloud environment 205-a, the operating cloud environment 205-c, and the DMS cloud environment 205-d.

In some aspects, the computing resource manager 235 may search for an export storage account 250 that is present within the second cloud environment 205-b based on the user credentials associated with the request to download data. For example, the computing resource manager 235, or some other component in the DMS 110-a, may generate, prior to receiving the request to download the data, a pool of one or more export storage accounts 250 each associated with a respective geographical region of a set of geographical regions supported by the DMS 110-a. In such cases, based on the user credentials, the computing resource manager 235 may identify a geographical region of the computing device 115-a, or identify a geographical location or region of a computing system associated with the computing device 115-*a*, and the computing resource manager 235 may identify the export storage account 250 that corresponds to the identified geographical location or region.

Additionally, or alternatively, the computing resource manager 235 may generate the export storage account 250 as part of executing the prepare task of the export job. For example, if the computing resource manager 235 does not identify an export storage account 250 that corresponds to the same geographical region associated with the computing device 115-*a*, the computing resource manager 235 may generate a new export storage account 250 that is associated with the geographical region. The export storage account 250 may be internal to the DMS platform, and may not be configured with some firewall restrictions. As such, the export storage account 250 may be accessed by the customer via a link, such as a shared access signature (SAS) uniform resource identifier (URI). The link may be provided to the customer if the customer is authenticated by the DMS platform. If the customer is not authenticated, the link will not be provided, and the customer may not access the export storage account 250, which may improve security.

The computing resource manager 235 may subsequently send the credentials for the export storage account 250, the user credentials, or both to the computing resources 245. Additionally, the computing resource manager 235 may forward the request or information associated with the request to the computing resources 245 (e.g., an indication of an address or file associated with the requested data). The computing resources 245 may establish a connection with the export storage account 250 based on the credentials.

To execute the perform task of the export job, the computing resources 245 may fetch the requested data from the snapshot storage account 240 in the first cloud environment 205-*a*, decrypt the data, and write the decrypted data to the export storage account 250. In some aspects, decrypting the data may include changing a format of the data from a first format that is supported by the DMS 110-*a* to a second format that is supported by or accessible to the computing device 115-*a*. In some aspects, the data may be written to the export storage account 250 in a file having a compressed format, such as a ZIP format or some other archive format. After the data is written to the export storage account 250, the DMS 110-*a* may generate an encrypted download link to the file including the decrypted data in the export storage account 250. Additionally, or alternatively, the computing resources 245 may generate the download link and transmit the download link to the DMS 110-*a* (e.g., the task chain manager 230) for encryption, or the computing resources 245 may generate and encrypt the download link.

To execute the finish task of the export job, the task chain manager 230 may instruct the user interface 220 of the DMS 110-*a* to send the encrypted download link to the computing device 115-*a* that sent the download request. The user may select the link in response to receiving the link via the computing device 115-*a*. When the user selects the link, the user may be directed to an interface, such as an authentication page or a login page, where the user may be asked to input user credentials for a platform associated with the DMS 110-*a*. The DMS 110-*a* may verify the user credentials input into the interface. In some aspects, the verification may occur automatically in response to the user inputting the user credentials. If the user credentials are verified (e.g., if the user has permission to access the DMS platform), the link may be decrypted. In some aspects, the decrypted link may redirect the user to the export storage account 250 (e.g., the link may be provided to the user as a SAS URI). For example, once the credentials are verified, the link may direct the user to the file containing the requested data in the export storage account 250.

The user, once verified by the DMS 110-*a*, may thereby access the requested data in the export storage account 250 and download the requested data directly to the computing device 115-*a*. The data may be transferred directly between the export storage account 250 and the computing device 115-*a*, which may reduce latency as compared with utilizing the DMS 110-*a* as a proxy.

To improve security of the data stored in the export storage account 250, the DMS 110-*a* may, in some aspects, configure a time-to-live period for the data stored in the export storage account 250. For example, the DMS 110-*a* may configure the export storage account 250 to store any given data file for no longer than the time-to-live period, or the DMS 110-*a* may instruct the computing resources 245 to indicate a respective time-to-live period for each file that is written to the export storage account 250. The time-to-live period may be configured to start at a first time at which the decrypted data is written to the export storage account 250. The data may be configured to be deleted or removed from the export storage account 250 at a second time at which the time-to-live period expires. The time-to-live period may be, for example, 24 hours, 48 hours, or some other time period. By configuring a time-to-live period, the DMS 110-*a* may reduce or mitigate security risks associated with storing the decrypted data in the export storage account 250.

The utilization of the export storage account 250 for snapshot downloads may support improved scalability of the services provided by the DMS 110-*a*. For example, the DMS 110-*a* may configure and support multiple export storage accounts 250 each associated with a different region (e.g., subscription group of the DMS 110-*a*), which may provide for the DMS 110-*a* to support an increased quantity of customers. Each customer may download data directly from a respective export storage account 250, which may increase throughput and decrease latency.

In some aspects, the operations illustrated in the computing environment 200 may be performed by any combination of components, including the components illustrated in FIG. 2, as well as additional components. For example, tasks performed by the DMS 110-*a* may be executed by the user interface 220, the export job manager 225, the task chain manager 230, the computing resource manager 235, some other circuitry or component, or any combination thereof. Similarly, tasks executed within the snapshot storage cloud environment 205-*a* may be executed by the computing resource manager 235, the computing resources 245, or some other circuitry or component not illustrated in FIG. 2. The components may include or be implemented by hardware (e.g., including circuitry, processing blocks, logic components, and other components), code (e.g., software or firmware) executed by a processor, or any combination thereof.

Figure 3:
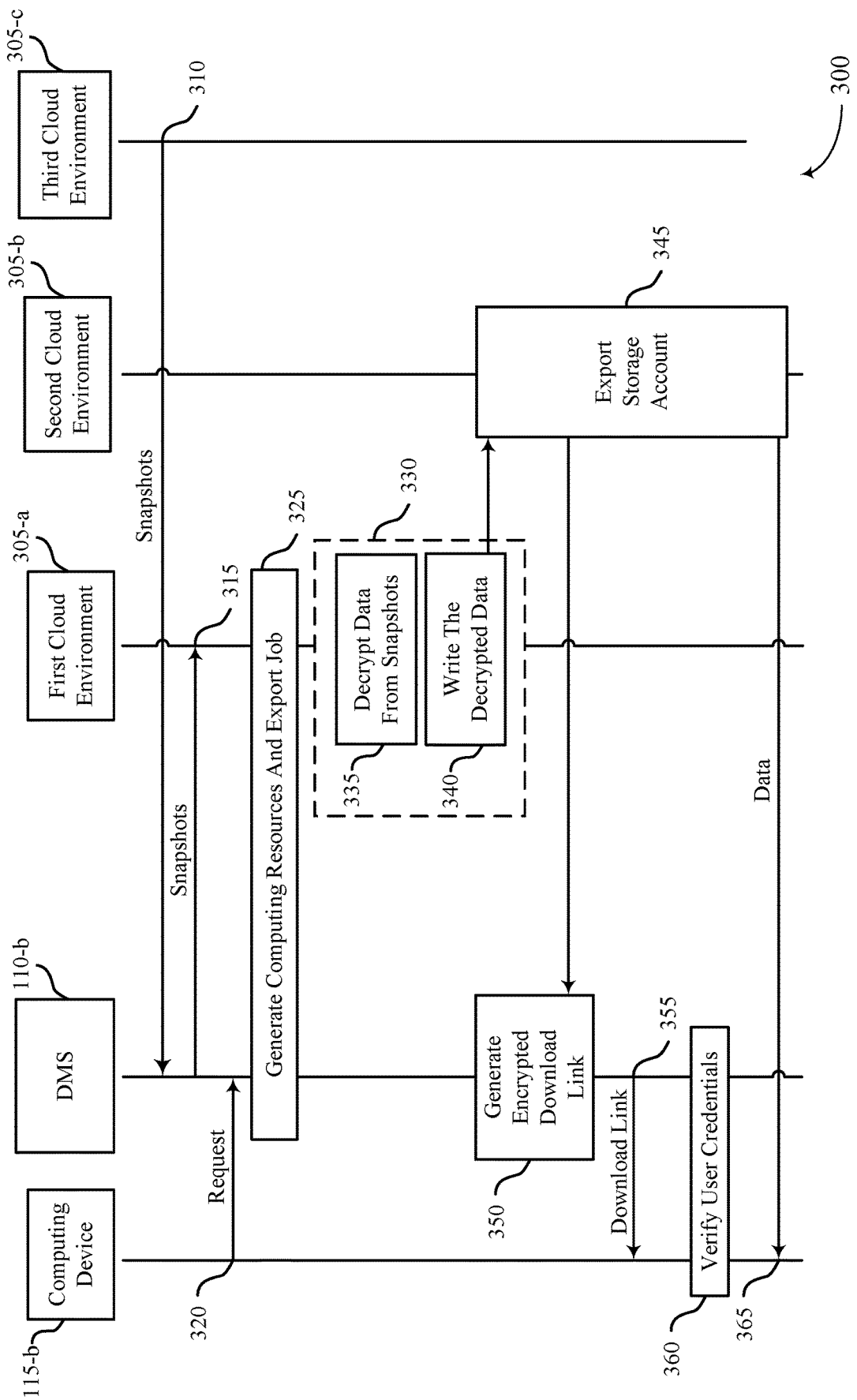
FIG. 3 illustrates an example of a process flow that supports snapshot export from SaaS platforms in accordance with aspects of the present disclosure.

FIG. 3 illustrates an example of a process flow 300 that supports snapshot export from SaaS platforms in accordance with aspects of the present disclosure. The process flow 300 may implement or be implemented by aspects of the computing environments 100 and 200 described with reference to FIGS. 1 and 2. For example, the process flow 300 may be implemented by a computing device 115-*b*, a DMS 110-*b*, and cloud environments 305-*a*, 305-*b*, and 305-*c*, which may each represent examples of corresponding components, devices, and environments as described with reference to FIGS. 1 and 2. In some aspects, the DMS 110-*a* may operate in a fourth cloud environment (not pictured in FIG. 3), which may represent an example of the DMS cloud environment 205-*d* illustrated in FIG. 2. The process flow 300 may describe a method for the DMS 110-*b* to facilitate efficient downloads of data from the second cloud environment 305-*b* (e.g., an export storage cloud environment) to the computing device 115-*b*, as described with reference to FIGS. 1 and 2.

In some aspects, the operations illustrated in the process flow 300 may be performed by hardware (e.g., including circuitry, processing blocks, logic components, and other components), code (e.g., software or firmware) executed by a processor, or any combination thereof. For example, aspects of the process flow 300 may be implemented or managed by an export manager, an export job manager, a task chain manager, a computing resource manager, a set of computing resources, or some other software or application within a DMS 110-*b* or cloud environment 305. Alternative examples of the following may be implemented, where some steps are performed in a different order than described or are not performed at all. In some cases, steps may include additional features not mentioned below, or further steps may be added.

At 310, the DMS 110-*b* may obtain one or more snapshots of computing resources in the third cloud environment 305-*c* associated with a customer. The third cloud environment 305-*c* may represent an example of the operating cloud environment 205-*c* described with reference to FIG. 2. For example, the customer may maintain and operate data within the third cloud environment 305-*c*. At 315, the DMS 110-*b* may store the snapshots in a snapshot storage account for the customer in the first cloud environment 305-*a*. In some aspects, the DMS 110-*b* may generate one or more computing resources in the first cloud environment 305-*a* for obtaining and storing the snapshots. The snapshot storage account may represent an example of the snapshot storage account 240 described with reference to FIG. 2 and the first cloud environment 305-*a* may represent an example of the snapshot storage cloud environment 205-*a* described with reference to FIG. 2.

In some aspects, prior to obtaining and storing the snapshots, the DMS 110-*b* may generate the snapshot storage account for the customer associated with the computing device 115-*b* in the first cloud environment 305-*a*. For example, the DMS 110-*b* may receive a request from the customer to manage the customer's data, and the DMS 110-*b* may generate the snapshot storage account based on the request. Additionally, or alternatively, the customer may generate the snapshot storage account in the first cloud environment 305-*a*. In such cases, the customer may send, via the computing device 115-*b* (which may alternatively be referred to as a local device or local system) instructions to the DMS 110-*b* that indicate one or more parameters or settings for the snapshot storage account. The DMS 110-*b* may determine the snapshot storage account for the computing device 115-*b* based on the instructions. The snapshot storage account may be configured with one or more firewalls or other security restrictions, such that the DMS 110-*b* may access the snapshots within the snapshot storage account, but the customer or other entities may not access the snapshots within the snapshot storage account, for enhanced security.

At 320, a user of the computing device 115-*b* may send, to the DMS 110-*b* via a user interface, a request to download data associated with one or more snapshots stored in the first cloud environment 305-*a*. The request may be referred to as an export request. The data subject to the request may, in some aspects, correspond to a first version of a file that may be associated with an earlier point-in-time than a second version of the file that is stored in the third cloud environment 305-*c* associated with the computing device 115-*b*.

At 325, the DMS 110-*b* may generate, in response to the request to download the data, an export job for execution by one or more computing resources in the second cloud environment 305-*b*. The DMS 110-*b* may, in some aspects, generate the computing resources in the second cloud environment 305-*b* prior to generating the export job. In some aspects, generating the export job and the computing resources may be performed by an export job manager or a computing resource manager, or some other component or circuitry within the DMS 110-*b*, as described with reference to FIG. 2.

At 330, the DMS 110-*b* may initiate a task chain associated with the exportjob for execution by the one or more computing resources. In some aspects, portions of the task chain may be performed by or executed by the DMS 110-*b*. For example, as part of a prepare task, the DMS 110-*b* may determine credentials associated with the request to download the data. The request may include the credentials, which may identify the user, one or more parameters associated with the computing device 115-*b*, or both. The DMS 110-*b* may identify an export storage account 345 in the second cloud environment 305-*b* that is configured with storage credentials that are associated with or correspond to the credentials identified via the request to download the data.

In some aspects, if the DMS 110-*b* does not identify an export storage account that corresponds to the user credentials, the DMS 110-*b* may generate the export storage account 345, as described with reference to FIG. 2. The export storage account 345 may be configured to store data for one or more computing systems 105, including a computing system 105 associated with the computing device 115-*b*, that are located within a same geographical region. The DMS 110-*b* may instruct the one or more computing resources in the first cloud environment 305-*a* to establish a connection with the export storage account 345 based on the storage credentials.

After establishing the connection with the export storage account 345, the one or more computing resources in the first cloud environment 305-*a* may execute a perform task based on the task chain. At 335, as part of executing the perform task, the computing resources may fetch the requested data from the snapshot storage account in the first cloud environment 305-*a* and decrypt the data. At 340, as part of executing the perform task, the computing resources may write the decrypted data to the export storage account 345 in the second cloud environment 305-*b*. In some aspects, writing the decrypted data to the export storage account 345 may include writing the decrypted data in a compressed format to the export storage account 345 (e.g., a ZIP format, or some other compressed format). In some aspects, the DMS 110-*b* may configure a time-to-live period for the decrypted data in the export storage account 345. The time-to-live period may be configured to start at a first time at which the decrypted data is written to the export storage account 345 and may expire at a second time. The decrypted data may be configured to be deleted or removed from the export storage account 345 at the second time. The time-to-live configuration may improve security.

At 350, as part of the perform task or a finish task of the export job, the DMS 110-*b* may generate an encrypted download link that is operable to download the decrypted data from the export storage account 345. In some aspects, the computing resources in the first cloud environment 305-*a* may generate the download link, and the DMS 110-*b* may encrypt the download link, or the computing resources may generate and encrypt the download link. At 355, the DMS 110-*b* may transmit the encrypted download link to the computing device 115-*b* associated with the request to download the data. A user of the computing device 115-*b* may select the download link. Once selected, the encrypted download link may be operable to direct the user to an interface where the user may be asked to enter user credentials for a platform of the DMS 110-*b*.

At 355, the DMS 110-*b* may receive the credentials associated with the computing device 115-*b*. At 360, the DMS 110-*b* may verify the credentials. In some aspects, verifying the credentials may include comparing the credentials with a set of credentials stored in a database. In some aspects, the verification process may be performed automatically. If the credentials are verified (e.g., validated), the DMS 110-*b* may decrypt the download link. The decrypted download link (e.g., a SAS URI) may be operable to direct the computing device 115-*b* to the decrypted data in the export storage account 345.

At 365, the computing device 115-*b* may export (e.g., download) a file including the decrypted data from the export storage account 345 to a hard drive of the computing device 115-*b* based on the decrypted download link. The computing device 115-*b* may thereby directly access the data and download the data directly from the export storage account 345 (e.g., without using the DMS 110-*b* as a proxy), which may reduce latency and improve throughput associated with downloading data from snapshots.

Figure 4:
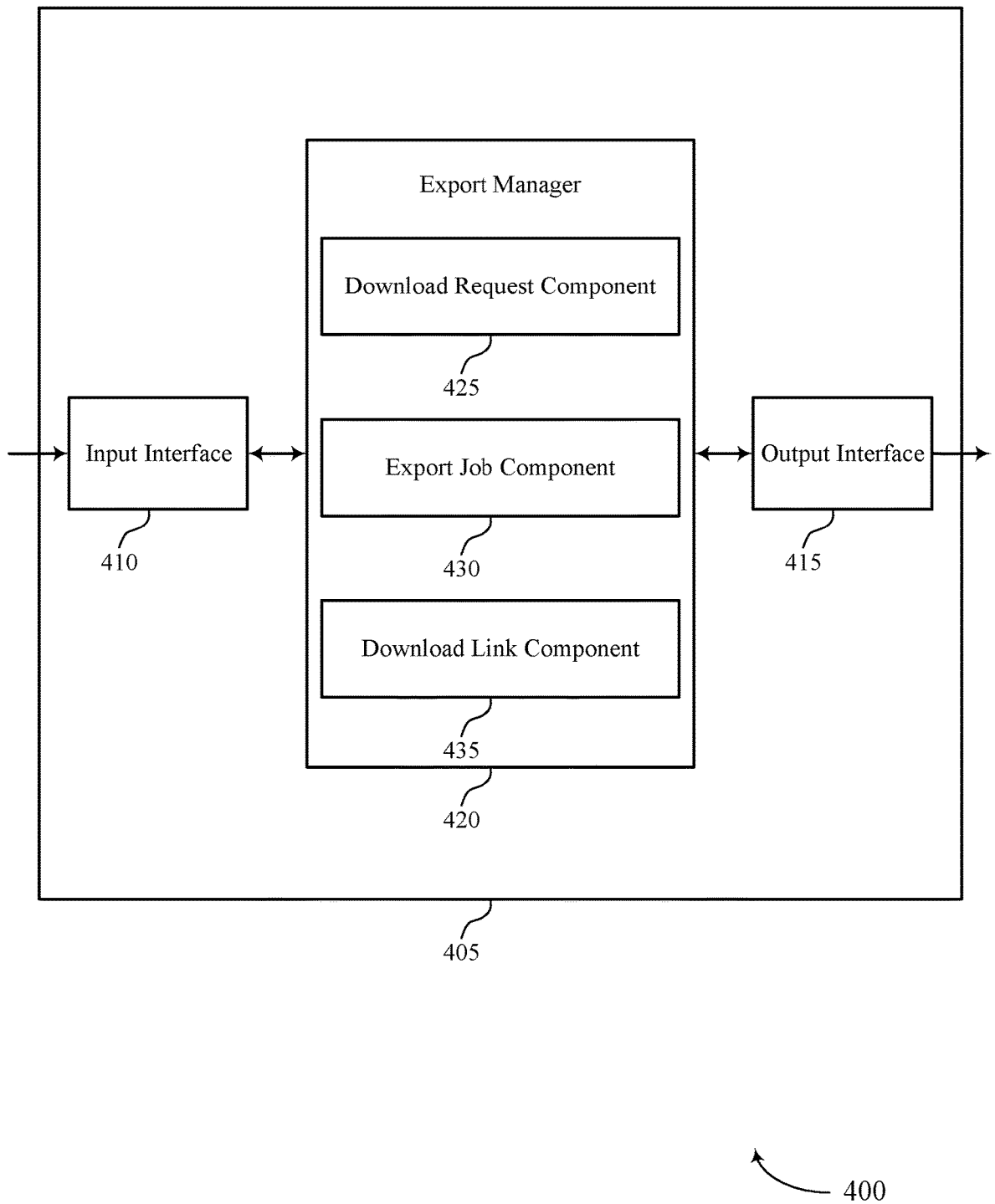
FIG. 4 shows a block diagram of a system that supports snapshot export from SaaS platforms in accordance with aspects of the present disclosure.

FIG. 4 shows a block diagram 400 of a system 405 that supports snapshot export from SaaS platforms in accordance with aspects of the present disclosure. In some examples, the system 405 may be an example of aspects of one or more components described with reference to FIG. 1, such as a DMS 110. The system 405 may include an input interface 410, an output interface 415, and an export manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the storage manager 420 to support snapshot export from SaaS platforms. In some cases, the input interface 410 may be a component of a network interface 615 as described with reference to FIG. 6.

The output interface 415 may manage output signaling for the system 405. For example, the output interface 415 may receive signaling from other components of the system 405, such as the export manager 420, and may transmit such output signaling corresponding to (e.g., representative of or otherwise based on) such signaling to other systems or devices. In some cases, the output interface 415 may be a component of a network interface 615 as described with reference to FIG. 6.

The export manager 420 may include a download request component 425, an exportjob component 430, a download link component 435, or any combination thereof. In some examples, the export manager 420, or various components thereof, may be configured to perform various operations (e.g., receiving, monitoring, transmitting) using or otherwise in cooperation with the input interface 410, the output interface 415, or both. For example, the export manager 420 may receive information from the input interface 410, send information to the output interface 415, or be integrated in combination with the input interface 410, the output interface 415, or both to receive information, transmit information, or perform various other operations as described herein.

The download request component 425 may be configured as or otherwise support a means for receiving, at a DMS, a request to download data associated with one or more snapshots stored in a first cloud environment. The export job component 430 may be configured as or otherwise support a means for generating, by the DMS in response to the request to download the data, an export job for execution by one or more computing resources within the first cloud environment, where the export job is operable to decrypt the data and write the decrypted data to an export storage account in a second cloud environment. The download link component 435 may be configured as or otherwise support a means for generating, by the DMS, an encrypted download link that is operable to download the decrypted data from the export storage account. The download link component 435 may be configured as or otherwise support a means for transmitting, by the DMS, the encrypted download link to a computing device associated with the request to download the data.

Figure 5:
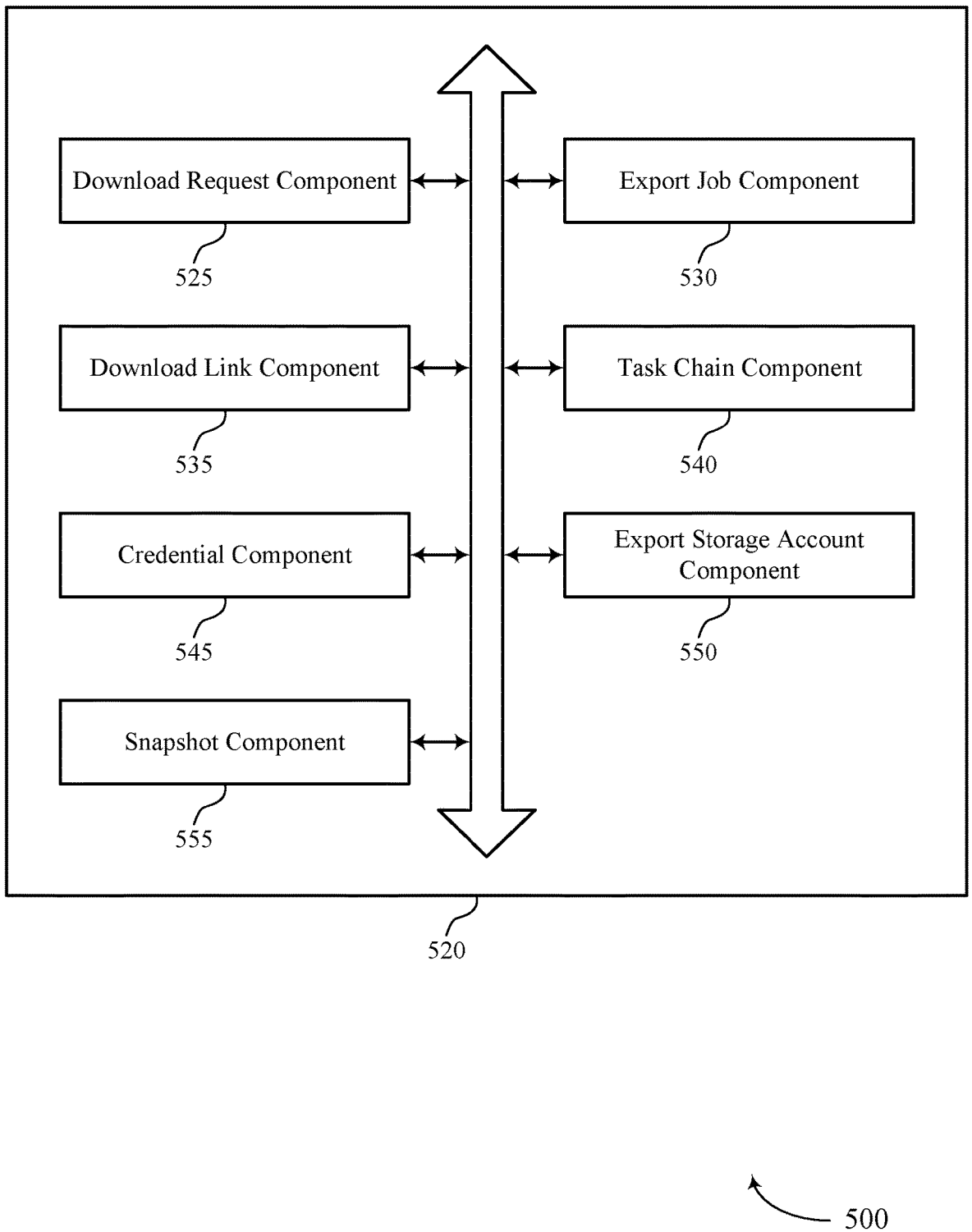
FIG. 5 shows a block diagram of an export manager that supports snapshot export from SaaS platforms in accordance with aspects of the present disclosure.

FIG. 5 shows a block diagram 500 of an export manager 520 that supports snapshot export from SaaS platforms in accordance with aspects of the present disclosure. The export manager 520 may be an example of aspects of an export manager 420, as described herein. The export manager 520, or various components thereof, may be an example of means for performing various aspects of snapshot export from SaaS platforms as described herein. For example, the export manager 520 may include a download request component 525, an export job component 530, a download link component 535, a task chain component 540, a credential component 545, an export storage account component 550, a snapshot component 555, or any combination thereof. Each of these components may communicate, directly or indirectly, with one another (e.g., via one or more buses, communications links, communications interfaces, or any combination thereof).

The download request component 525 may be configured as or otherwise support a means for receiving, at a DMS, a request to download data associated with one or more snapshots stored in a first cloud environment. The export job component 530 may be configured as or otherwise support a means for generating, by the DMS in response to the request to download the data, an export job for execution by one or more computing resources within the first cloud environment, where the export job may be operable to decrypt the data and write the decrypted data to an export storage account in a second cloud environment. The download link component 535 may be configured as or otherwise support a means for generating, by the DMS, an encrypted download link that is operable to download the decrypted data from the export storage account. In some examples, the download link component 535 may be configured as or otherwise support a means for transmitting, by the DMS, the encrypted download link to a computing device associated with the request to download the data.

In some examples, the exportjob component 530 may be configured as or otherwise support a means for generating, by the DMS after receiving the request to download the data, the one or more computing resources in the first cloud environment for execution of the export job. In some examples, the task chain component 540 may be configured as or otherwise support a means for initiating, by the DMS, a task chain associated with the export job for execution by the one or more computing resources.

In some examples, the credential component 545 may be configured as or otherwise support a means for determining, by the DMS, credentials associated with the request to download the data. In some examples, the export storage account component 550 may be configured as or otherwise support a means for identifying, by the DMS, the export storage account in the second cloud environment based on storage credentials associated with the export storage account corresponding to the credentials associated with the request to download the data. In some examples, the exportjob component 530 may be configured as or otherwise support a means for instructing the one or more computing resources to establish a connection with the export storage account in the second cloud environment based on the storage credentials, where writing, as part of the export job, the decrypted data to the export storage account is based on establishing the connection.

In some examples, the credential component 545 may be configured as or otherwise support a means for determining, by the DMS, credentials associated with the request to download the data. In some examples, the export storage account component 550 may be configured as or otherwise support a means for generating, by the DMS, the export storage account in the second cloud environment based on the credentials associated with the request to download the data. In some examples, the exportjob component 530 may be configured as or otherwise support a means for instructing the one or more computing resources to establish a connection with the export storage account in the second cloud environment based on storage credentials associated with the export storage account, where writing, as part of the export job, the data to the export storage account is based on establishing the connection.

In some examples, the export storage account may be configured to store data for one or more computing systems located within a same geographical region, the one or more computing systems including a computing system associated with the computing device.

In some examples, the export storage account component 550 may be configured as or otherwise support a means for configuring a time-to-live period for the decrypted data in the export storage account, where the time-to-live period is configured to start at a first time at which the decrypted data is written to the export storage account, and where the decrypted data is configured to be deleted from the export storage account in response to an expiration of the time-to-live period.

In some examples, the credential component 545 may be configured as or otherwise support a means for receiving credentials associated with the computing device after transmitting the encrypted download link to the computing device, where the encrypted download link is operable to direct, when selected, the computing device to an interface for inputting the credentials. In some examples, the credential component 545 may be configured as or otherwise support a means for verifying the credentials associated with the computing device. In some examples, the download link component 535 may be configured as or otherwise support a means for decrypting, based on a verification of the credentials, the encrypted download link, where the decrypted download link directs the computing device to the decrypted data in the export storage account.

In some examples, writing, as part of executing the exportjob, the decrypted data to the export storage account may include writing the decrypted data to the export storage account in a compressed format. In some examples, the data subject to the request to download may correspond to a first version of a file, the first version associated with an earlier point-in-time than a second version of the file that is stored in a third cloud environment associated with the computing device.

In some examples, the snapshot component 555 may be configured as or otherwise support a means for generating, within the first cloud environment, a snapshot storage account for a computing system associated with the computing device. In some examples, the snapshot component 555 may be configured as or otherwise support a means for obtaining the one or more snapshots of computing resources from a third cloud environment that is associated with the computing system. In some examples, the snapshot component 555 may be configured as or otherwise support a means for storing the one or more snapshots in the snapshot storage account in the first cloud environment after obtaining the one or more snapshots.

In some examples, the snapshot component 555 may be configured as or otherwise support a means for obtaining the one or more snapshots of computing resources from a third cloud environment that is associated with a computing system, the computing system associated with the computing device. In some examples, the snapshot component 555 may be configured as or otherwise support a means for determining, based on instructions from the computing system, a snapshot storage account for the computing system in the first cloud environment. In some examples, the snapshot component 555 may be configured as or otherwise support a means for storing the one or more snapshots in the snapshot storage account in the first cloud environment after obtaining the one or more snapshots.

Figure 6:
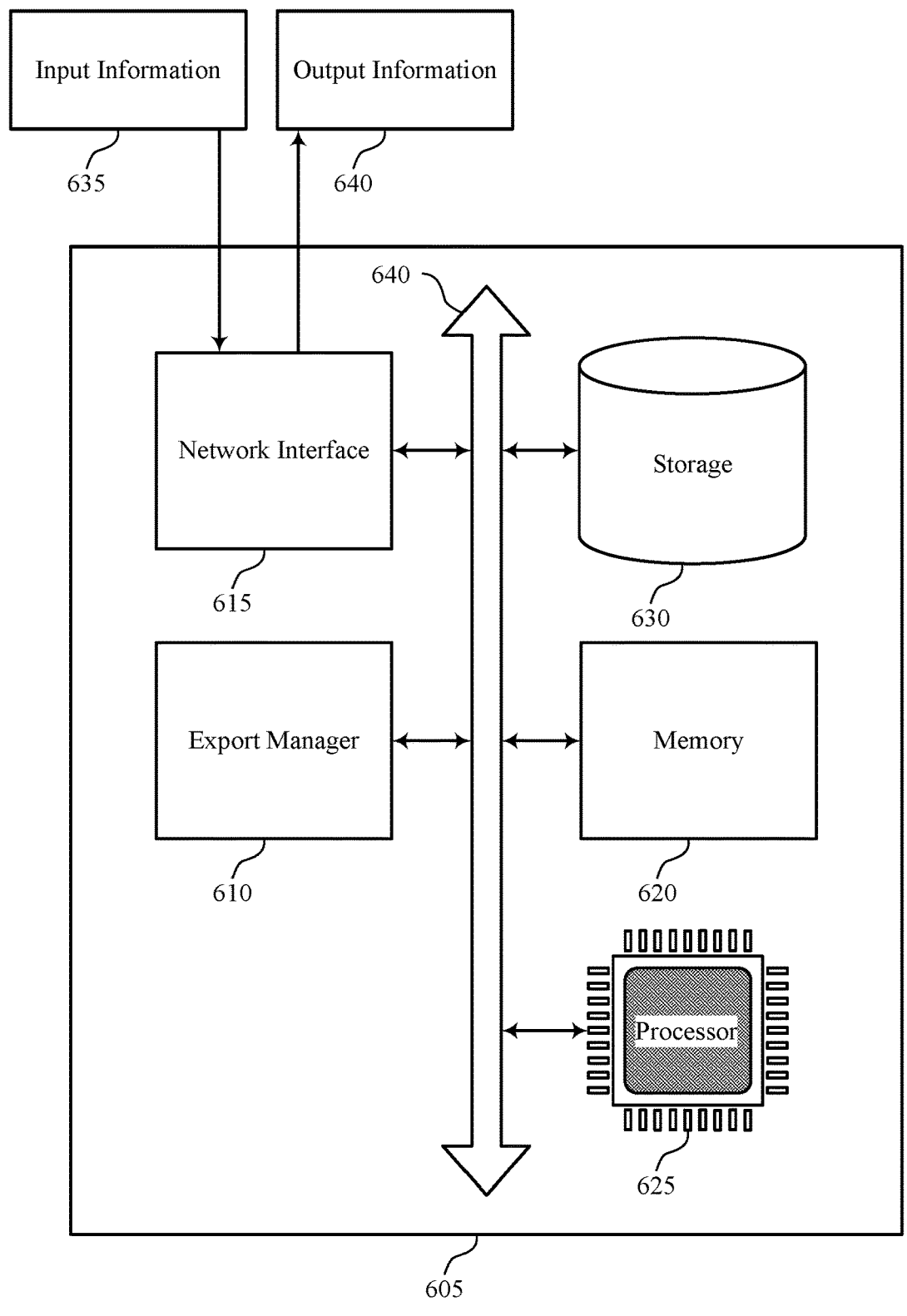
FIG. 6 shows a diagram of a system including a device that supports snapshot export from SaaS platforms in accordance with aspects of the present disclosure.

FIG. 6 shows a block diagram 600 of a system 605 that supports snapshot export from SaaS platforms in accordance with aspects of the present disclosure. The system 605 may be an example of or include the components of a system 405 as described herein. The system 605 may include components for bi-directional data communications including components such as an export manager 610, a network interface 615, memory 620, a processor 625, and storage 630. These components may be in electronic communication or otherwise coupled with each other (e.g., operatively, communicatively, functionally, electronically, electrically; via one or more buses, communications links, communications interfaces, or any combination thereof). Additionally, the components of the system 605 may comprise corresponding physical components or may be implemented as corresponding virtual components (e.g., components of one or more virtual machines). In some examples, the system 605 may be an example of aspects of one or more components described with reference to FIG. 1, such as a DMS 110.

The network interface 615 may enable the system 605 to exchange information (e.g., input information 635, output information 640, or both) with other systems or devices (not shown). For example, the network interface 615 may enable the system 605 to connect to a network (e.g., a network 120 as described herein). The network interface 615 may include one or more wireless network interfaces, one or more wired network interfaces, or any combination thereof. In some examples, the network interface 615 may be an example of aspects of one or more components described with reference to FIG. 1, such as one or more network interfaces 165.

Memory 620 may include RAM, ROM, or both. The memory 620 may store computer-readable, computer-executable software including instructions that, when executed, cause the processor 625 to perform various functions described herein. In some cases, the memory 620 may contain, among other things, a basic input/output system (BIOS), which may control basic hardware or software operation such as the interaction with peripheral components or devices. In some cases, the memory 620 may be an example of aspects of one or more components described with reference to FIG. 1, such as one or more memories 175.

The processor 625 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 625 may be configured to execute computer-readable instructions stored in a memory 620 to perform various functions (e.g., functions or tasks supporting snapshot export from SaaS platforms). Though a single processor 625 is depicted in the example of FIG. 6, it is to be understood that the system 605 may include any quantity of one or more of processors 625 and that a group of processors 625 may collectively perform one or more functions ascribed herein to a processor, such as the processor 625. In some cases, the processor 625 may be an example of aspects of one or more components described with reference to FIG. 1, such as one or more processors 170.

Storage 630 may be configured to store data that is generated, processed, stored, or otherwise used by the system 605. In some cases, the storage 630 may include one or more HDDs, one or more SDDs, or both. In some examples, the storage 630 may be an example of a single database, a distributed database, multiple distributed databases, a data store, a data lake, or an emergency backup database. In some examples, the storage 630 may be an example of one or more components described with reference to FIG. 1, such as one or more network disks 180.

The export manager 610 may be configured as or otherwise support a means for receiving, at a DMS, a request to download data associated with one or more snapshots stored in a first cloud environment. The export manager 610 may be configured as or otherwise support a means for generating, by the DMS in response to the request to download the data, an export job for execution by one or more computing resources within the first cloud environment, where the export job may be operable to decrypt the data and write the decrypted data to an export storage account in a second cloud environment. The export manager 610 may be configured as or otherwise support a means for generating, by the DMS, an encrypted download link that is operable to download the decrypted data from the export storage account. The export manager 610 may be configured as or otherwise support a means for transmitting, by the DMS, the encrypted download link to a computing device associated with the request to download the data.

By including or configuring the export manager 610 in accordance with examples as described herein, the system 605 may support techniques for reduced latency and improved throughput of snapshot exports, improved security and isolation between networks, and more reliable data management services.

Figure 7:
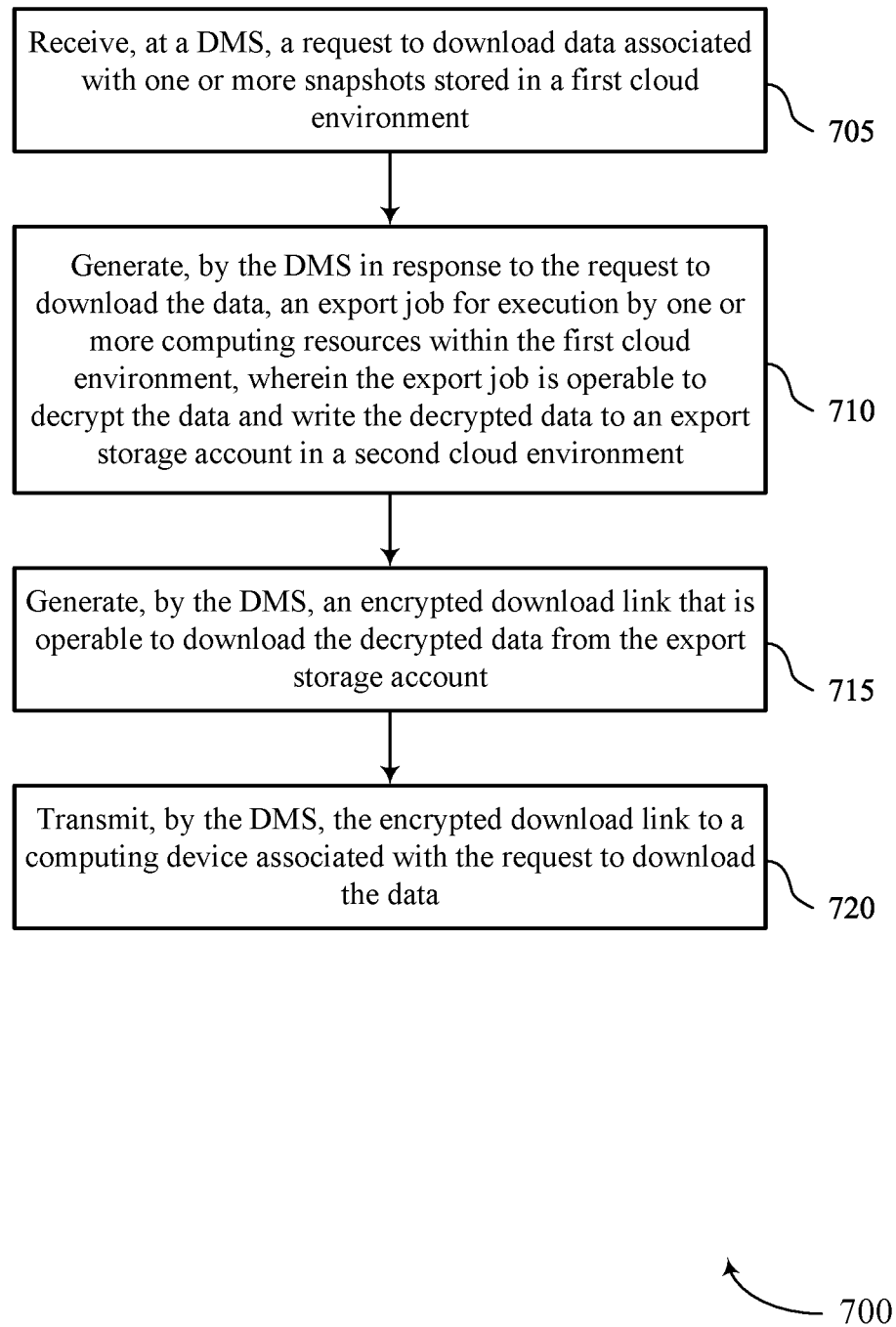
FIGS. 7 through 10 show flowcharts illustrating methods that support snapshot export from SaaS platforms in accordance with aspects of the present disclosure.

FIG. 7 shows a flowchart illustrating a method 700 that supports snapshot export from SaaS platforms in accordance with aspects of the present disclosure. The operations of the method 700 may be implemented by a system or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include receiving, at the DMS, a request to download data associated with one or more snapshots stored in a first cloud environment. The operations of 705 may be performed in accordance with examples as disclosed herein. In some examples, aspects of the operations of 705 may be performed by a download request component 525 as described with reference to FIG. 5.

At 710, the method may include generating, by the DMS in response to the request to download the data, an export job for execution by one or more computing resources within the first cloud environment, where the export job may be operable to decrypt the data and write the decrypted data to an export storage account in a second cloud environment. The operations of 710 may be performed in accordance with examples as disclosed herein. In some examples, aspects of the operations of 710 may be performed by an exportjob component 530 as described with reference to FIG. 5.

At 715, the method may include generating, by the DMS, an encrypted download link that is operable to download the decrypted data from the export storage account. The operations of 715 may be performed in accordance with examples as disclosed herein. In some examples, aspects of the operations of 715 may be performed by a download link component 535 as described with reference to FIG. 5.

At 720, the method may include transmitting, by the DMS, the encrypted download link to a computing device associated with the request to download the data. The operations of 720 may be performed in accordance with examples as disclosed herein. In some examples, aspects of the operations of 720 may be performed by a download link component 535 as described with reference to FIG. 5.

Figure 8:
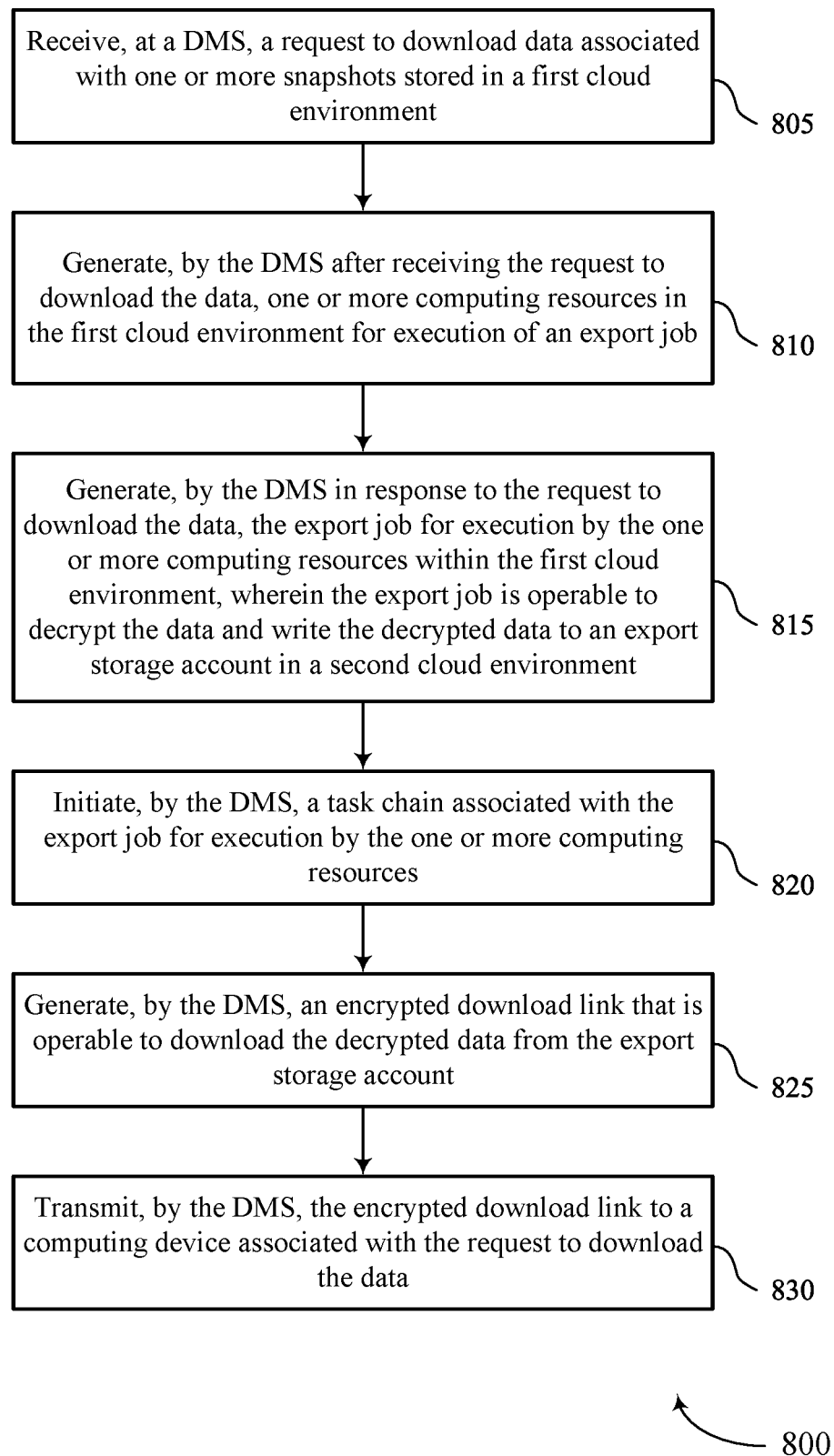

FIG. 8 shows a flowchart illustrating a method 800 that supports snapshot export from SaaS platforms in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include receiving, at a DMS, a request to download data associated with one or more snapshots stored in a first cloud environment. The operations of 805 may be performed in accordance with examples as disclosed herein. In some examples, aspects of the operations of 805 may be performed by a download request component 525 as described with reference to FIG. 5.

At 810, the method may include generating, by the DMS after receiving the request to download the data, one or more computing resources in the first cloud environment for execution of an export job. The operations of 810 may be performed in accordance with examples as disclosed herein.

In some examples, aspects of the operations of 810 may be performed by an exportjob component 530 as described with reference to FIG. 5.

At 815, the method may include generating, by the DMS in response to the request to download the data, an export job for execution by the one or more computing resources within the first cloud environment, where the export job may be operable to decrypt the data and write the decrypted data to an export storage account in a second cloud environment. The operations of 815 may be performed in accordance with examples as disclosed herein. In some examples, aspects of the operations of 815 may be performed by an exportjob component 530 as described with reference to FIG. 5.

At 820, the method may include initiating, by the DMS, a task chain associated with the export job for execution by the one or more computing resources. The operations of 820 may be performed in accordance with examples as disclosed herein. In some examples, aspects of the operations of 820 may be performed by a task chain component 540 as described with reference to FIG. 5.

At 825, the method may include generating, by the DMS, an encrypted download link that is operable to download the decrypted data from the export storage account. The operations of 825 may be performed in accordance with examples as disclosed herein. In some examples, aspects of the operations of 825 may be performed by a download link component 535 as described with reference to FIG. 5.

At 830, the method may include transmitting, by the DMS, the encrypted download link to a computing device associated with the request to download the data. The operations of 830 may be performed in accordance with examples as disclosed herein. In some examples, aspects of the operations of 830 may be performed by a download link component 535 as described with reference to FIG. 5.

Figure 9:
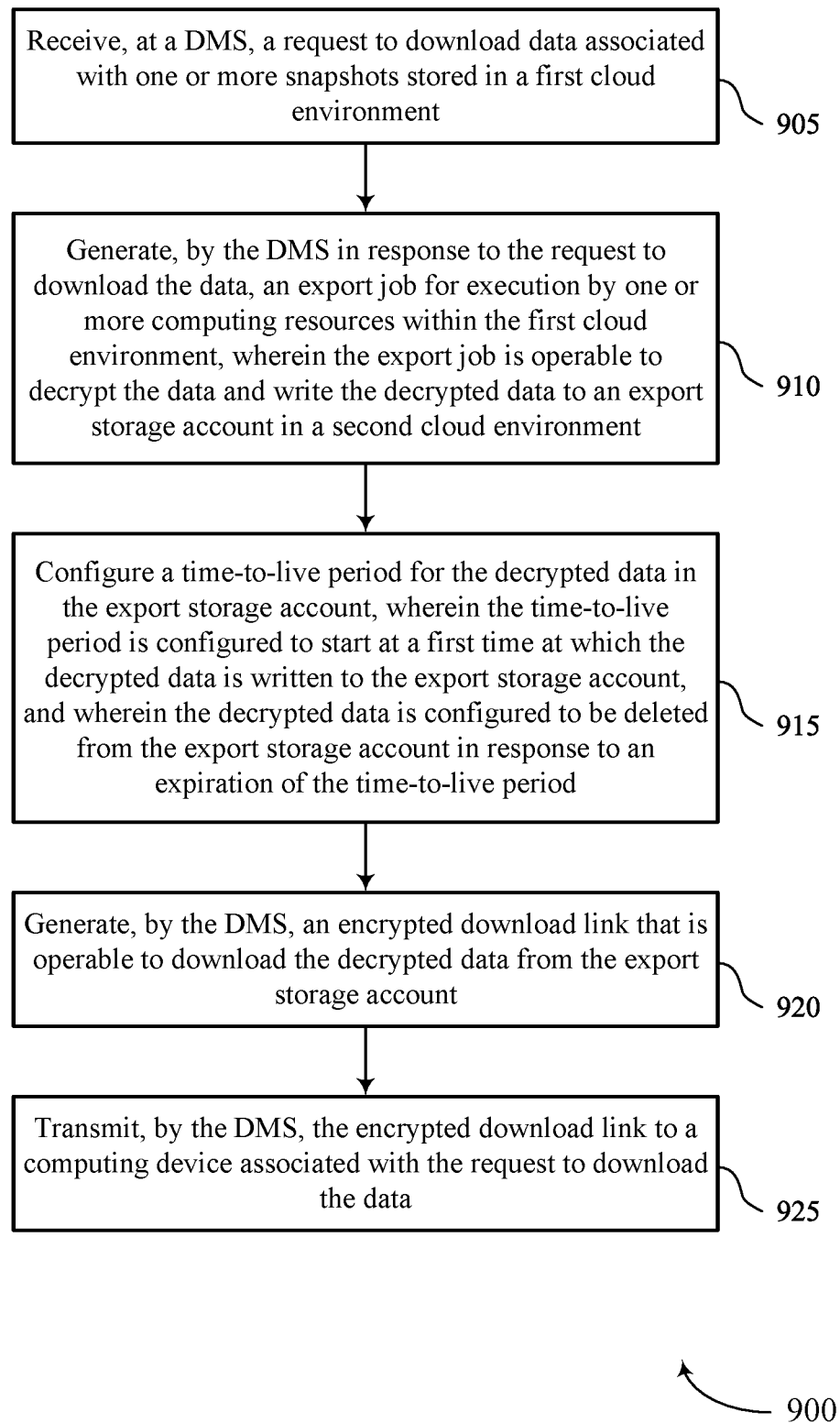

FIG. 9 shows a flowchart illustrating a method 900 that supports snapshot export from SaaS platforms in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include receiving, at the DMS, a request to download data associated with one or more snapshots stored in a first cloud environment. The operations of 905 may be performed in accordance with examples as disclosed herein. In some examples, aspects of the operations of 905 may be performed by a download request component 525 as described with reference to FIG. 5.

At 910, the method may include generating, by the DMS in response to the request to download the data, an export job for execution by one or more computing resources within the first cloud environment, where the export job may be operable to decrypt the data and write the decrypted data to an export storage account in a second cloud environment. The operations of 910 may be performed in accordance with examples as disclosed herein. In some examples, aspects of the operations of 910 may be performed by an exportjob component 530 as described with reference to FIG. 5.

At 915, the method may include configuring a time-to-live period for the decrypted data in the export storage account, where the time-to-live period is configured to start at a first time at which the decrypted data is written to the export storage account, and where the decrypted data is configured to be deleted from the export storage account in response to an expiration of the time-to-live period. The operations of 915 may be performed in accordance with examples as disclosed herein. In some examples, aspects of the operations of 915 may be performed by an export storage account component 550 as described with reference to FIG. 5.

At 920, the method may include generating, by the DMS, an encrypted download link that is operable to download the decrypted data from the export storage account. The operations of 920 may be performed in accordance with examples as disclosed herein. In some examples, aspects of the operations of 920 may be performed by a download link component 535 as described with reference to FIG. 5.

At 925, the method may include transmitting, by the DMS, the encrypted download link to a computing device associated with the request to download the data. The operations of 925 may be performed in accordance with examples as disclosed herein. In some examples, aspects of the operations of 925 may be performed by a download link component 535 as described with reference to FIG. 5.

Figure 10:
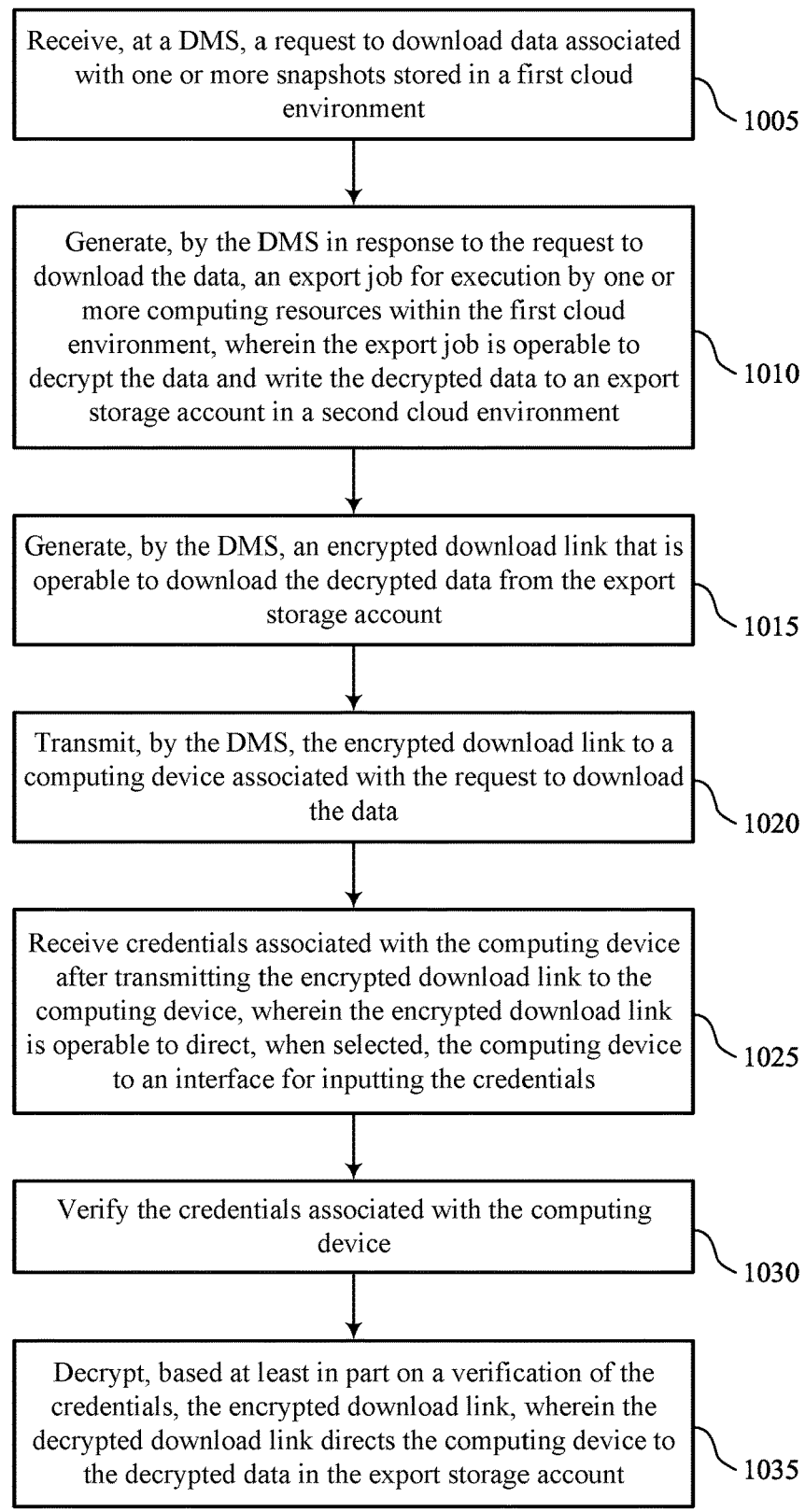

FIG. 10 shows a flowchart illustrating a method 1000 that supports snapshot export from SaaS platforms in accordance with aspects of the present disclosure. The operations of the method 1000 may be implemented by a DMS or its components as described herein. For example, the operations of the method 1000 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 1005, the method may include receiving, at the DMS, a request to download data associated with one or more snapshots stored in a first cloud environment. The operations of 1005 may be performed in accordance with examples as disclosed herein. In some examples, aspects of the operations of 1005 may be performed by a download request component 525 as described with reference to FIG. 5.

At 1010, the method may include generating, by the DMS in response to the request to download the data, an export job for execution by one or more computing resources within the first cloud environment, where the export job may be operable to decrypt the data and write the decrypted data to an export storage account in a second cloud environment. The operations of 1010 may be performed in accordance with examples as disclosed herein. In some examples, aspects of the operations of 1010 may be performed by an exportjob component 530 as described with reference to FIG. 5.

At 1015, the method may include generating, by the DMS, an encrypted download link that is operable to download the decrypted data from the export storage account. The operations of 1015 may be performed in accordance with examples as disclosed herein. In some examples, aspects of the operations of 1015 may be performed by a download link component 535 as described with reference to FIG. 5.

At 1020, the method may include transmitting, by the DMS, the encrypted download link to a computing device associated with the request to download the data. The operations of 1020 may be performed in accordance with examples as disclosed herein. In some examples, aspects of the operations of 1020 may be performed by a download link component 535 as described with reference to FIG. 5.

At 1025, the method may include receiving credentials associated with the computing device after transmitting the encrypted download link to the computing device, where the encrypted download link is operable to direct, when selected, the computing device to an interface for inputting the credentials. The operations of 1025 may be performed in accordance with examples as disclosed herein. In some examples, aspects of the operations of 1025 may be performed by a credential component 545 as described with reference to FIG. 5.

At 1030, the method may include verifying the credentials associated with the computing device. The operations of 1030 may be performed in accordance with examples as disclosed herein. In some examples, aspects of the operations of 1030 may be performed by a credential component 545 as described with reference to FIG. 5.

At 1035, the method may include decrypting, based on a verification of the credentials, the encrypted download link, where the decrypted download link directs the computing device to the decrypted data in the export storage account. The operations of 1035 may be performed in accordance with examples as disclosed herein. In some examples, aspects of the operations of 1035 may be performed by a download link component 535 as described with reference to FIG. 5.

A method is described. The method may include receiving, at a DMS, a request to download data associated with one or more snapshots stored in a first cloud environment, generating, by the DMS in response to the request to download the data, an export job for execution by one or more computing resources within the first cloud environment, where the export job is operable to decrypt the data and write the decrypted data to an export storage account in a second cloud environment, generating, by the DMS, an encrypted download link that is operable to download the decrypted data from the export storage account, and transmitting, by the DMS, the encrypted download link to a computing device associated with the request to download the data.

An apparatus is described. The apparatus may include at least one processor, memory coupled with the at least one processor, and instructions stored in the memory. The instructions may be executable by the at least one processor to cause the apparatus to receive, at a DMS, a request to download data associated with one or more snapshots stored in a first cloud environment, generate, by the DMS in response to the request to download the data, an export job for execution by one or more computing resources within the first cloud environment, where the export job is operable to decrypt the data and write the decrypted data to an export storage account in a second cloud environment, generate, by the DMS, an encrypted download link that is operable to download the decrypted data from the export storage account, and transmit, by the DMS, the encrypted download link to a computing device associated with the request to download the data.

Another apparatus is described. The apparatus may include means for receiving, at a DMS, a request to download data associated with one or more snapshots stored in a first cloud environment, means for generating, by the DMS in response to the request to download the data, an export job for execution by one or more computing resources within the first cloud environment, where the export job is operable to decrypt the data and write the decrypted data to an export storage account in a second cloud environment, means for generating, by the DMS, an encrypted download link that is operable to download the decrypted data from the export storage account, and means for transmitting, by the DMS, the encrypted download link to a computing device associated with the request to download the data.

A non-transitory computer-readable medium storing code is described. The code may include instructions executable by at least one processor to receive, at a DMS, a request to download data associated with one or more snapshots stored in a first cloud environment, generate, by the DMS in response to the request to download the data, an export job for execution by one or more computing resources within the first cloud environment, where the export job is operable to decrypt the data and write the decrypted data to an export storage account in a second cloud environment, generate, by the DMS, an encrypted download link that is operable to download the decrypted data from the export storage account, and transmit, by the DMS, the encrypted download link to a computing device associated with the request to download the data.

Some examples of the method, apparatuses, and non-transitory computer-readable medium described herein may further include operations, features, means, or instructions for generating, by the DMS after receiving the request to download the data, the one or more computing resources in the first cloud environment for execution of the export job and initiating, by the DMS, a task chain associated with the exportjob for execution by the one or more computing resources.

Some examples of the method, apparatuses, and non-transitory computer-readable medium described herein may further include operations, features, means, or instructions for determining, by the DMS, credentials associated with the request to download the data, identifying, by the DMS, the export storage account in the second cloud environment based on storage credentials associated with the export storage account corresponding to the credentials associated with the request to download the data, and instructing the one or more computing resources to establish a connection with the export storage account in the second cloud environment based on the storage credentials, where writing, as part of the exportjob, the decrypted data to the export storage account may be based on establishing the connection.

Some examples of the method, apparatuses, and non-transitory computer-readable medium described herein may further include operations, features, means, or instructions for determining, by the DMS, credentials associated with the request to download the data, generating, by the DMS, the export storage account in the second cloud environment based on the credentials associated with the request to download the data, and instructing the one or more computing resources to establish a connection with the export storage account in the second cloud environment based on storage credentials associated with the export storage account, where writing, as part of the export job, the data to the export storage account may be based on establishing the connection.

In some examples of the method, apparatuses, and non-transitory computer-readable medium described herein, the export storage account may be configured to store data for one or more computing systems located within a same geographical region, the one or more computing systems including a computing system associated with the computing device.

Some examples of the method, apparatuses, and non-transitory computer-readable medium described herein may further include operations, features, means, or instructions for configuring a time-to-live period for the decrypted data in the export storage account, where the time-to-live period may be configured to start at a first time at which the decrypted data may be written to the export storage account, and where the decrypted data may be configured to be deleted from the export storage account in response to an expiration of the time-to-live period.

Some examples of the method, apparatuses, and non-transitory computer-readable medium described herein may further include operations, features, means, or instructions for receiving credentials associated with the computing device after transmitting the encrypted download link to the computing device, where the encrypted download link may be operable to direct, when selected, the computing device to an interface for inputting the credentials, verifying the credentials associated with the computing device, and decrypting, based on a verification of the credentials, the encrypted download link, where the decrypted download link directs the computing device to the decrypted data in the export storage account.

Some examples of the method, apparatuses, and non-transitory computer-readable medium described herein may further include operations, features, means, or instructions for writing, as part of executing the export job, the decrypted data to the export storage account includes writing the decrypted data to the export storage account in a compressed format.

In some examples of the method, apparatuses, and non-transitory computer-readable medium described herein, the data subject to the request to download corresponds to a first version of a file, the first version associated with an earlier point-in-time than a second version of the file that may be stored in a third cloud environment associated with the computing device.

Some examples of the method, apparatuses, and non-transitory computer-readable medium described herein may further include operations, features, means, or instructions for generating, within the first cloud environment, a snapshot storage account for a computing system associated with the computing device, obtaining the one or more snapshots of computing resources from a third cloud environment that may be associated with the computing system, and storing the one or more snapshots in the snapshot storage account in the first cloud environment after obtaining the one or more snapshots.

Some examples of the method, apparatuses, and non-transitory computer-readable medium described herein may further include operations, features, means, or instructions for obtaining the one or more snapshots of computing resources from a third cloud environment that may be associated with a computing system, the computing system associated with the computing device, determining, based on instructions from the computing system, a snapshot storage account for the computing system in the first cloud environment, and storing the one or more snapshots in the snapshot storage account in the first cloud environment after obtaining the one or more snapshots.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, at a data management system, a request to download data associated with one or more snapshots stored in a first cloud environment;
   generating, by the data management system in response to the request to download the data, an export job for execution by one or more computing resources within the first cloud environment, wherein the export job is operable to decrypt the data and write the decrypted data to an export storage account in a second cloud environment;
   generating, by the data management system, an encrypted download link that is operable to download the decrypted data from the export storage account; and
   transmitting, by the data management system, the encrypted download link to a computing device associated with the request to download the data.

2. The method of claim 1, further comprising:
   generating, by the data management system after receiving the request to download the data, the one or more computing resources in the first cloud environment for execution of the export job; and
   initiating, by the data management system, a task chain associated with the export job for execution by the one or more computing resources.

3. The method of claim 1, further comprising:
   determining, by the data management system, credentials associated with the request to download the data;
   identifying, by the data management system, the export storage account in the second cloud environment based at least in part on storage credentials associated with the export storage account corresponding to the credentials associated with the request to download the data; and
   instructing the one or more computing resources to establish a connection with the export storage account in the second cloud environment based at least in part on the storage credentials, wherein writing, as part of the export job, the decrypted data to the export storage account is based at least in part on establishing the connection.

4. The method of claim 1, further comprising:
   determining, by the data management system, credentials associated with the request to download the data;
   generating, by the data management system, the export storage account in the second cloud environment based at least in part on the credentials associated with the request to download the data; and
   instructing the one or more computing resources to establish a connection with the export storage account in the second cloud environment based at least in part on storage credentials associated with the export storage account, wherein writing, as part of the export job, the data to the export storage account is based at least in part on establishing the connection.

5. The method of claim 1, wherein the export storage account is configured to store data for one or more computing systems located within a same geographical region, the one or more computing systems comprising a computing system associated with the computing device.

6. The method of claim 1, further comprising:
   configuring a time-to-live period for the decrypted data in the export storage account, wherein the time-to-live period is configured to start at a first time at which the decrypted data is written to the export storage account, and wherein the decrypted data is configured to be deleted from the export storage account in response to an expiration of the time-to-live period.

7. The method of claim 1, further comprising:
   receiving credentials associated with the computing device after transmitting the encrypted download link to the computing device, wherein the encrypted download link is operable to direct, when selected, the computing device to an interface for inputting the credentials;
   verifying the credentials associated with the computing device; and
   decrypting, based at least in part on a verification of the credentials, the encrypted download link, wherein the decrypted download link directs the computing device to the decrypted data in the export storage account.

8. The method of claim 1, wherein writing, as part of executing the export job, the decrypted data to the export storage account comprises writing the decrypted data to the export storage account in a compressed format.

9. The method of claim 1, wherein the data subject to the request to download corresponds to a first version of a file, the first version associated with an earlier point-in-time than a second version of the file that is stored in a third cloud environment associated with the computing device.

10. The method of claim 1, further comprising:
    generating, within the first cloud environment, a snapshot storage account for a computing system associated with the computing device;
    obtaining the one or more snapshots of computing resources from a third cloud environment that is associated with the computing system; and storing the one or more snapshots in the snapshot storage account in the first cloud environment after obtaining the one or more snapshots.

11. The method of claim 1, further comprising:
obtaining the one or more snapshots of computing resources from a third cloud environment that is associated with a computing system, the computing system associated with the computing device;
determining, based at least in part on instructions from the computing system, a snapshot storage account for the computing system in the first cloud environment; and
storing the one or more snapshots in the snapshot storage account in the first cloud environment after obtaining the one or more snapshots.

12. An apparatus, comprising:
at least one processor;
memory coupled with the at least one processor; and
instructions stored in the memory and executable by the at least one processor to cause the apparatus to:
receive, at a data management system, a request to download data associated with one or more snapshots stored in a first cloud environment;
generate, by the data management system in response to the request to download the data, an export job for execution by one or more computing resources within the first cloud environment, wherein the export job is operable to decrypt the data and write the decrypted data to an export storage account in a second cloud environment;
generate, by the data management system, an encrypted download link that is operable to download the decrypted data from the export storage account; and
transmit, by the data management system, the encrypted download link to a computing device associated with the request to download the data.

13. The apparatus of claim 12, wherein the instructions are further executable by the at least one processor to cause the apparatus to:
generate, by the data management system after receiving the request to download the data, the one or more computing resources in the first cloud environment for execution of the export job; and
initiate, by the data management system, a task chain associated with the export job for execution by the one or more computing resources.

14. The apparatus of claim 12, wherein the instructions are further executable by the at least one processor to cause the apparatus to:
determine, by the data management system, credentials associated with the request to download the data;
identify, by the data management system, the export storage account in the second cloud environment based at least in part on storage credentials associated with the export storage account corresponding to the credentials associated with the request to download the data; and
instruct the one or more computing resources to establish a connection with the export storage account in the second cloud environment based at least in part on the storage credentials, wherein the export job is operable to write the decrypted data to the export storage account based at least in part on the connection.

15. The apparatus of claim 12, wherein the instructions are further executable by the at least one processor to cause the apparatus to:
determine, by the data management system, credentials associated with the request to download the data;

generate, by the data management system, the export storage account in the second cloud environment based at least in part on the credentials associated with the request to download the data; and
instruct the one or more computing resources to establish a connection with the export storage account in the second cloud environment based at least in part on storage credentials associated with the export storage account, wherein the export job is operable to write the data to the export storage account based at least in part on the connection.

16. The apparatus of claim 12, wherein the export storage account is configured to store data for one or more computing systems located within a same geographical region, the one or more computing systems comprising at least a computing system associated with the computing device.

17. The apparatus of claim 12, wherein the instructions are further executable by the at least one processor to cause the apparatus to:
configure a time-to-live period for the decrypted data in the export storage account, wherein the time-to-live period is configured to start at a first time at which the decrypted data is written to the export storage account, and wherein the decrypted data is configured to be deleted from the export storage account in response to an expiration of the time-to-live period.

18. A non-transitory computer-readable medium storing code, the code comprising instructions executable by at least one processor to:
receive, at a data management system, a request to download data associated with one or more snapshots stored in a first cloud environment;
generate, by the data management system in response to the request to download the data, an export job for execution by one or more computing resources within the first cloud environment, wherein the exportjob is operable to decrypt the data and write the decrypted data to an export storage account in a second cloud environment;
generate, by the data management system, an encrypted download link that is operable to download the decrypted data from the export storage account; and
transmit, by the data management system, the encrypted download link to a computing device associated with the request to download the data.

19. The non-transitory computer-readable medium of claim 18, wherein the instructions are further executable by the at least one processor to:
generate, by the data management system after receiving the request to download the data, the one or more computing resources in the first cloud environment for execution of the export job; and
initiate, by the data management system, a task chain associated with the export job for execution by the one or more computing resources.

20. The non-transitory computer-readable medium of claim 18, wherein the instructions are further executable by the at least one processor to:
determine, by the data management system, credentials associated with the request to download the data;
identify, by the data management system, the export storage account in the second cloud environment based at least in part on storage credentials associated with the export storage account corresponding to the credentials associated with the request to download the data; and instruct the one or more computing resources to establish a connection with the export storage account in the second cloud environment based at least in part on the storage credentials, wherein the export job is operable to write the decrypted data to the export storage account based at least in part on the connection.

* * * * *